United States Patent
Okamoto et al.

(10) Patent No.: US 12,173,766 B2
(45) Date of Patent: Dec. 24, 2024

(54) HIGHLY DURABLE SPRING AND METHOD OF COATING THE SAME

(71) Applicants: CHUO HATSUJO KABUSHIKI KAISHA, Nagoya (JP); SHINTO PAINT CO., LTD., Amagasaki (JP)

(72) Inventors: Takayuki Okamoto, Nagoya (JP); Yasuhiko Kunita, Nagoya (JP); Shota Otsuka, Amagasaki (JP); Masaki Kannami, Amagasaki (JP)

(73) Assignees: CHUO HATSUJO KABUSHIKI KAISHA, Nagoya (JP); SHINTO PAINT CO., LTD., Amagasaki (JP)

( * ) Notice: Subject to any disclaimer, the term of this patent is extended or adjusted under 35 U.S.C. 154(b) by 633 days.

(21) Appl. No.: 16/087,873

(22) PCT Filed: Mar. 8, 2017

(86) PCT No.: PCT/JP2017/009241
§ 371 (c)(1),
(2) Date: Sep. 24, 2018

(87) PCT Pub. No.: WO2017/163877
PCT Pub. Date: Sep. 28, 2017

(65) Prior Publication Data
US 2019/0107165 A1    Apr. 11, 2019

(30) Foreign Application Priority Data

Mar. 25, 2016    (JP) .................... 2016-061120

(51) Int. Cl.
*F16F 1/02*    (2006.01)
*B05D 1/06*    (2006.01)
*C08G 59/62*    (2006.01)
*C09D 5/03*    (2006.01)
*C09D 5/10*    (2006.01)
*C09D 7/40*    (2018.01)
*C09D 7/61*    (2018.01)
*C09D 163/00*    (2006.01)
*F16F 1/12*    (2006.01)
*B05D 3/02*    (2006.01)
*C08K 3/08*    (2006.01)
*F16F 1/04*    (2006.01)

(52) U.S. Cl.
CPC .............. *F16F 1/021* (2013.01); *B05D 1/06* (2013.01); *C08G 59/621* (2013.01); *C09D 5/03* (2013.01); *C09D 5/038* (2013.01); *C09D 5/10* (2013.01); *C09D 5/106* (2013.01); *C09D 7/40* (2018.01); *C09D 7/61* (2018.01); *C09D 163/00* (2013.01); *F16F 1/02* (2013.01); *F16F 1/12* (2013.01); *B05D 3/0254* (2013.01); *B05D 2202/10* (2013.01); *B05D 2504/00* (2013.01); *B05D 2601/28* (2013.01); *C08K 2003/0893* (2013.01); *F16F 1/04* (2013.01); *F16F 2224/0208* (2013.01); *F16F 2226/02* (2013.01)

(58) Field of Classification Search
CPC ...... F16F 1/021; F16F 1/02; F16F 1/12; F16F 1/04; F16F 2224/0208; F16F 2226/02; F16F 1/024; C09D 5/10; C09D 7/40; C09D 5/038; C09D 7/61; C09D 5/106; C09D 5/03; C09D 163/00; C08G 59/621; B05D 1/06; B05D 2202/10; B05D 2504/00; B05D 2601/28; B05D 3/0254; C08K 2003/0893
See application file for complete search history.

(56) References Cited

U.S. PATENT DOCUMENTS

| 6,045,873 A * | 4/2000 | Adachi | C09D 5/106 |
| | | | 525/530 |
| 2007/0116963 A1 | 5/2007 | Sakakibara | |
| 2007/0172665 A1 | 7/2007 | Kunita et al. | |
| 2010/0256282 A1 * | 10/2010 | Breidenstein | F16F 1/024 |
| | | | 524/440 |
| 2010/0308517 A1 * | 12/2010 | Goodson | C22C 19/05 |
| | | | 267/154 |
| 2012/0258316 A1 * | 10/2012 | Lucas | C09D 7/61 |
| | | | 428/418 |
| 2016/0355690 A1 | 12/2016 | Saito et al. | |

FOREIGN PATENT DOCUMENTS

| EP | 0832908 A1 | 4/1998 |
| EP | 3063242 B1 | 1/2018 |
| JP | H10-157004 A | 6/1998 |
| JP | 2005-171297 A | 6/2005 |
| JP | 2007-198490 A | 8/2007 |
| JP | 2007-313475 A | 12/2007 |
| JP | 2007-314712 A | 12/2007 |

(Continued)

OTHER PUBLICATIONS

May 30, 2017 International Search Report issued in International Patent Application No. PCT/JP2017/009241.
May 30, 2017 Written Opinion issued in International Patent Application No. PCT/JP2017/009241.

*Primary Examiner* — Callie E Shosho
*Assistant Examiner* — Bethany M Miller
(74) *Attorney, Agent, or Firm* — Oliff PLC

(57) ABSTRACT

A highly durable spring of the present invention includes a single-layer coating film with a thickness of 450 μm or less, in which the coating film contains an epoxy resin, a phenolic resin, and zinc. The coating film has high corrosion resistance and chipping resistance even if it is a one thin layer with a thickness of 450 μm or less. A method of coating a highly durable spring of the present invention includes an application process in which an epoxy resin-based powder coating material which contains an epoxy resin, a phenolic resin, and zinc and is produced by a melt kneading method is applied to a surface of a spring on which a coating-film is formed and a baking process in which the applied epoxy resin-based powder coating material is baked.

13 Claims, No Drawings

(56) References Cited

FOREIGN PATENT DOCUMENTS

| | | |
|---|---|---|
| JP | 2011-079994 A | 4/2011 |
| JP | 2016-114137 A | 6/2016 |
| WO | 2007/138399 A2 | 12/2007 |
| WO | WO-2007138396 A1 * 12/2007 | ............... B05D 7/54 |
| WO | WO-2015063024 A1 * 5/2015 | ........... C09D 163/00 |
| WO | 2015/159890 A1 | 10/2015 |

* cited by examiner

HIGHLY DURABLE SPRING AND METHOD OF COATING THE SAME

TECHNICAL FIELD

The present invention relates to a highly durable spring having excellent corrosion resistance and chipping resistance and a method of coating the same.

BACKGROUND ART

Various suspension springs are used for automobiles, railway vehicles and the like. Most of such suspension springs are made of steel and generally, a coating is applied to surfaces thereof in order to impart corrosion resistance. When automobiles run, pebbles or gravels bounced up by wheels collide with suspension springs. Thereby, so-called chipping in which a coating film peels off occurs. When a base material of a spring is exposed by chipping, rusting is likely to occur. Therefore, it is necessary for a coating film of the suspension spring to have high chipping resistance in addition to corrosion resistance. In addition, large distortion due to deformation occurs in the suspension spring. Therefore, it is necessary for a coating film of the suspension spring to have flexibility so that it can follow movement of the spring in addition to corrosion resistance and chipping resistance. In consideration of use in cold climates, such characteristics are required to be maintained at low temperatures.

For example, in Patent Literature 1, a highly durable spring having a coating film formed of a powder coating material containing an epoxy resin, a softener made of a thermoplastic resin and a curing agent is disclosed. In addition, in Patent Literature 2, a composition containing an epoxy resin, a curing agent, a fibrous filler and thermally expandable resin particles is disclosed as a coating material composition suitable for coating automobile parts. In Patent Literature 3, a coated article in which a second coating film formed of a second powder coating material containing an epoxy resin, a curing agent, a fibrous filler, and thermally expandable resin particles is formed on a first coating film formed of a first powder coating material containing an epoxy resin, zinc, and a curing agent is disclosed.

PATENT LITERATURE

Patent Literature 1: Japanese Unexamined Patent Application Publication No. 2007-198490
Patent Literature 2: Japanese Unexamined Patent Application Publication No. 2007-314712
Patent Literature 3: Japanese Unexamined Patent Application Publication No. 2007-313475

SUMMARY OF THE INVENTION

As described in the above patent literature, in the related art, in order to impart chipping resistance to a coating film, components such as a softener, a fibrous filler, and thermally expandable resin particles are added. Therefore, in addition to high cost, the smoothness of the coating film is likely to be lowered, and it is necessary to consider the dispersibility of the fillers. In addition, in Patent Literature 1, a powder coating material in which an epoxy resin and a softener are dried and blended together is used. According to the powder coating material, a part that is not applied to a coating target article during coating can be recovered and easily reused. However, in the case of a dry-blended powder coating material, components of the recovered part often differ from initial components adjusted for coating. Thus, it is difficult to manage coating material components.

Coated articles described in Patent Literature 1 and 3 have a two-layer coating film. That is, on a surface of the spring, an undercoat layer having anti-corrosion performance is first formed and a top coat layer having chipping resistance is formed thereon. In the case of coated articles in the related art, in order to secure corrosion resistance and chipping resistance, a plurality of coating films are laminated and thickening of a coating film is inevitable. In this case, the number of processes in the coating operation increases, an operation time is longer, and the cost increases. In addition, when the thickness of the coating film is thick, for example, it is difficult to perform coating on a part with a narrow pitch such as a pigtail end of a coil spring.

The present invention has been made in view of the above circumstances, and an object of the present invention is to provide a highly durable spring having desired corrosion resistance and chipping resistance simply by forming only a single-layer thin coating film. In addition, an object of the present invention is to provide a coating method for realizing a highly durable spring.

(1) A highly durable spring of the present invention includes a single-layer coating film with a thickness of 450 µm or less, in which the coating film contains an epoxy resin, a phenolic resin, and zinc.

The coating film formed on the highly durable spring of the present invention contains an epoxy resin, a phenolic resin, and zinc. The phenolic resin functions as a curing agent of the epoxy resin. The phenolic resin reacts with an epoxy resin to form an ether bond. The ether bond is a linear bond. Thus, compared to a case in which another curing agent such as an amine type or an acid anhydride type forming a three-dimensional crosslinking structure is used, the coating film formed on the highly durable spring of the present invention has a lower crosslink density and is flexible. Thus, the adhesiveness and flexibility of the coating film are improved and the impact resistance is improved. Therefore, in the coating film formed on the highly durable spring of the present invention, even if components for improving softness and impact resistance are not added and the coating film has one thin layer with a thickness of 450 µm or less, it has desired flexibility and chipping resistance. In addition, as will be shown in the following examples, it is possible to maintain high flexibility and chipping resistance not only at normal temperature but also at low temperatures of about −30° C.

Zinc is contained in the coating film formed on the highly durable spring of the present invention. According to a sacrificial anticorrosive action of zinc, it is possible to improve anti-corrosion properties of the spring, that is, corrosion resistance. Thus, even if the coating film formed on the highly durable spring of the present invention has single-layer with a thin thickness, it is sufficiently practical as a coating film of a suspension spring for which high corrosion resistance and chipping resistance performance are required. In the highly durable spring of the present invention including such a coating film, even if a pebble or gravel collides therewith, the coating film is unlikely to peel off, and exposure of the base material is minimized. Even if the base material is exposed, corrosion is unlikely to occur due to a sacrificial anticorrosive action of zinc. Thus, the highly durable spring of the present invention has excellent durability. In addition, in the highly durable spring of the present invention, since there is no need to add a softener, a fibrous filler, or the like to the coating film, cost can be reduced. In addition, since the thickness of the coating film is thin and coating can also be performed on a part with a narrow pitch, the durability is further improved.

(2) A method of coating a highly durable spring of the present invention is a method of coating the highly durable spring of the present invention, including an application process in which an epoxy resin-based powder coating material which contains an epoxy resin, a phenolic resin, and zinc and is produced by a melt kneading method is applied to a surface of a spring on which a coating-film is formed; and a baking process in which the applied epoxy resin-based powder coating material is baked.

In the coating method of the present invention, the epoxy resin-based powder coating material applied in the application process is melted and cured by heating in the baking process and thereby a coating-film is formed. According to the coating method of the present invention, it is possible to easily produce the highly durable spring of the present invention. In the coating method of the present invention, in addition to the surface of the base material of the spring, when a phosphate coating is formed on the surface of the base material of the spring, "a surface of a spring on which a coating-film is formed" includes a surface of this coating.

In the coating method of the present invention, an epoxy resin-based powder coating material not containing components for improving softness and impact resistance such as a softener and a fibrous filler is used. In addition, since the thickness of the formed coating film is thin at 450 μm or less, it is possible to reduce an amount of the powder coating material used. Therefore, it is possible to produce the highly durable spring at a low cost accordingly. In addition, since it is sufficient to form the coating film with only single-layer, the number of processes is reduced and an operation time is shortened compared to when a plurality of coating films are formed.

The epoxy resin-based powder coating material is produced by a melt kneading method rather than dry blending. Therefore, when a coating material that did not apply to the spring is recovered, components of the recovered part are the same as initial components adjusted for coating. Therefore, management of coating material components is unnecessary, and the epoxy resin-based powder coating material is easily reused.

MODES FOR CARRYING OUT THE INVENTION

A highly durable spring and a method of coating the same according to embodiments of the present invention will be described below. Here, the highly durable spring and the method of coating the same of the present invention are not limited to the following embodiments, and various embodiments that can be modified and improved by those skilled in the art can be made without departing from the spirit and scope of the present invention.

<Highly Durable Spring>

In the highly durable spring of the present invention, the shape of the spring to be coated is not particularly limited. For example, springs having various shapes such as a coil spring, a leaf spring, a stabilizer, and a torsion bar can be used. A material of the spring is not particularly limited as long as it is a metal. Generally, spring steel used for a spring is suitable. For example, spring steel is hot-molded or cold-molded, and is then subjected to shot peening, and the surface roughness of the spring may be adjusted. In addition, a coating of a phosphate such as zinc phosphate or iron phosphate may be formed on a surface of the base material of the spring. In this case, the surface on which a coating-film is formed becomes the surface of the phosphate coating. When the phosphate coating is disposed below the coating film, corrosion resistance of the spring and adhesiveness of the coating film are improved. In particular, when the phosphate is zinc phosphate, corrosion resistance is further improved. The phosphate coating may be formed by a method known in the related art. For example, an immersion method in which a spring is immersed in a phosphate solution tank and a spray method in which a phosphate solution is sprayed onto a spring by a spray gun may be used.

The coating film in the highly durable spring of the present invention is single-layer and has a thickness of 450 μm or less. A thinner thickness is desirable as long as desired corrosion resistance and chipping resistance can be realized. For example, the thickness is 400 μm or less, preferably 300 μm or less, and more preferably 200 μm or less. On the other hand, in order to secure desired corrosion resistance and chipping resistance, the thickness of the coating film is desirably 100 μm or more.

The coating film includes an epoxy resin, a phenolic resin, and zinc. In the coating film, the phenolic resin and the epoxy resin are linearly bonded by an ether bond. Therefore, compared to a coating film mainly having a three-dimensional crosslinking structure, the crosslink density is small and it is flexible. For example, desirably, the breaking stress of the coating film at normal temperature is 25 MPa or more and 100 MPa or less, the elongation rate is 3% or more and 80% or less, and the elastic modulus is 2,000 MPa or more and 7,000 MPa or less. As values of the breaking stress, the elongation rate, and the elastic modulus, values measured using a rectangular coating film with a width of 10 mm, a length of 40 mm, and a thickness of 300 μm under conditions of a temperature of 20° C. and a tensile speed of 5 mm/min using and "Autograph AG-X" (commercially available from Shimadzu) are used Examples of the epoxy resin include a bisphenol A type epoxy resin, a bisphenol F type epoxy resin, and a crystalline epoxy resin. These may be used alone or two or more thereof may be used in combination. Among them, the bisphenol A type epoxy resin is suitable because a balance between softness and durability is favorable.

An epoxy equivalent of the epoxy resin may be 300 g/eq or more and 4,000 g/eq or less. When the epoxy equivalent is less than 300 g/eq, the epoxy resin is in a liquid state and is not suitable for preparing a powder coating material. In addition, the softness of the coating film is lowered. On the other hand, when the epoxy equivalent exceeds 4,000 g/eq, melting becomes difficult and it is difficult to form a smooth coating film. In order to improve softness and smoothness of the coating film, a suitable epoxy equivalent is 600 g/eq or more and 2,000 g/eq or less and more suitably 1,500 g/eq or less. A softening point of the epoxy resin is desirably 70° C. or higher and 140° C. or lower.

As the phenolic resin, a bifunctional type resin is desirably used in order to form a linear crosslinking structure by reacting with an epoxy resin. An active hydrogen equivalent of the phenolic resin may be 100 g/eq or more and 4,000 g/eq or less. When the active hydrogen equivalent is less than 100 g/eq, a solid state cannot be maintained and the storage stability deteriorates. In addition, the softness of the coating film is lowered. On the other hand, when the active hydrogen equivalent exceeds 4,000 g/eq, since the molecular weight is large, melting becomes difficult and it is difficult to form a smooth coating film. In consideration of softness and smoothness of the coating film, a suitable active hydrogen equivalent is 200 g/eq or more and 1,000 g/eq or less and is preferably more than 500 g/eq and may be 600 g/eq or more and 720 g/eq or more. A softening point of the phenolic resin is desirably 70° C. or higher and 140° C. or lower.

A content of zinc may be 10 mass % or more and 70 mass % or less when the mass of the entire coating film is set as 100 mass %. When a content of zinc is less than 10 mass %, anti-corrosion performance of the coating film deteriorates. A suitable content of zinc is 15 mass % or more. On the other hand, when a content of zinc exceeds 70 mass %, softness of the coating film is lowered. A suitable content of zinc is 65 mass % or less. A particle size of zinc is not particularly limited. However, in order to improve smoothness of the coating film, powder having an average particle size of 2 μm or more and 15 μm or less may be contained.

The coating film in the highly durable spring of the present invention may contain various pigments such as a Coloring pigment and an extender pigment, a curing accelerator, a foaming preventing agent, a surface adjusting agent, an antioxidant, an antistatic agent, and a flame retardant in addition to the above epoxy resin, phenolic resin, and zinc. Examples of the Coloring pigment include inorganic pigments such as carbon black, titanium dioxide, red iron oxide, and yellow ocher, and organic pigments such as quinacridone red, phthalocyanine blue, and benzidine yellow. In addition, examples of the extender pigment include calcium carbonate, magnesium carbonate, talc, silica, and barium sulfate.

Here, when the coating film in the highly durable spring of the present invention contains the above epoxy resin, phenolic resin, and zinc, desired flexibility, chipping resistance, and anti-corrosion properties are realized. Therefore, there is no need to add components for improving softness and impact resistance such as a softener, a fibrous filler, thermally expandable resin particles, and a foaming agent. In addition, there is no need to add components for imparting anti-corrosion properties (corrosion resistance) such as anti-corrosion pigments such as molybdates, chromates, metal phosphides, phosphates, and silicates in addition to zinc. That is, in a suitable form of the coating film in the highly durable spring of the present invention, no components for improving softness and impact resistance such as a softener, a fibrous filler, thermally expandable resin particles, and a foaming agent or components for imparting anti-corrosion properties such as anti-corrosion pigment other than the epoxy resin, the phenolic resin, and zinc are contained.

The coating film in the highly durable spring of the present invention may contain a curing agent other than the phenolic resin. Examples of the curing agent of the epoxy resin include amine type curing agents such as an aliphatic amine, an alicyclic amine, and an aromatic amine, an acid anhydride type curing agent, dicyandiamide derivatives, and organic acid dihydrazide derivatives. However, such curing agents react with an epoxy resin and form a three-dimensional crosslinking structure. Therefore, the crosslink density of the coating film increases and the softness is lowered. Thus, in a suitable form of the coating film in the highly durable spring of the present invention, a phenolic resin is mainly contained as a curing agent.

The coating film in the highly durable spring of the present invention is a cured product of an epoxy resin-based powder coating material containing an epoxy resin, a phenolic resin, and zinc. A method of forming the coating film, that is, a method of coating a highly durable spring of the present invention, will be described below.

<Method of Coating Highly Durable Spring>

A method of coating a highly durable spring of the present invention includes an application process and a baking process.

(1) Application Process

The present process is a process in which an epoxy resin-based powder coating material which contains an epoxy resin, a phenolic resin, and zinc and is produced by a melt kneading method is applied to a surface of a spring on which a coating-film is formed.

The epoxy resin, phenolic resin, and zinc which are components of the epoxy resin-based powder coating material are as described above. When the epoxy resin-based powder coating material is prepared, an amount of the phenolic resin added may be 3 parts by mass or more and 3,000 parts by mass or less when an amount of the epoxy resin added is 100 parts by mass. When the amount of the phenolic resin added is less than 3 parts by mass, it is not possible for the epoxy resin to be sufficiently crosslinked, and the breaking stress, the elongation rate, and the elastic modulus of the coating film are lowered. In other words, the flexibility of the coating film is lowered. In addition, when the amount of the phenolic resin added exceeds 3,000 parts by mass, since an amount of the epoxy resin is relatively small, it is not possible to obtain a sufficient crosslinking structure and the flexibility of the coating film is lowered. In addition, an amount of zinc added may be 10 mass % or more and 70 mass % or less when the mass of the entire coating film is set as 100 mass %. A suitable amount of zinc added is 65 mass % or less.

The epoxy resin-based powder coating material may contain various pigments such as a Coloring pigment and an extender pigment, a curing agent other than the phenolic resin, a curing accelerator, a foaming preventing agent, a surface adjusting agent, an antioxidant, an antistatic agent, and a flame retardant in addition to the epoxy resin, the phenolic resin, and zinc. However, when a curing agent other than the phenolic resin is used, a three-dimensional crosslinking structure is formed and the softness of the coating film is lowered. Therefore, in a suitable form of the epoxy resin-based powder coating material, a phenolic resin is mainly contained as a curing agent. In addition, the epoxy resin-based powder coating material does not contain components for improving softness and impact resistance such as a softener, a fibrous filler, thermally expandable resin particles, and a foaming agent. In addition, when the epoxy resin-based powder coating material contains zinc, it has anti-corrosion properties. Therefore, no components for imparting anti-corrosion properties (corrosion resistance), for example, anti-corrosion pigments such as molybdates, chromates, metal phosphides, phosphates, and silicates other than zinc are contained. That is, in a suitable form of the epoxy resin-based powder coating material, an anti-corrosion pigment, a softener, a fibrous filler, thermally expandable resin particles, and a foaming agent are not contained.

The epoxy resin-based powder coating material is produced by a melt kneading method. For example, a coating material composition containing a coating material component such as an epoxy resin is mixed using a mixer, the mixture is then heated and kneaded using a kneader, the obtained kneaded material is pulverized and classified and an epoxy resin-based powder coating material may be produced. Then, the obtained epoxy resin-based powder coating material may be applied to a surface of a spring on which a coating-film is formed using, for example, an electrostatic coating gun and an electrostatic fluid immersion tank. When the electrostatic coating gun is used, the epoxy resin-based powder coating material may be charged when it passes through a nozzle of the electrostatic coating gun, and applied to a surface of the spring on which a coating-film is formed. A voltage may or may not be applied to the nozzle of the electrostatic coating gun as long as the epoxy resin-based powder coating material can be charged. When the electrostatic fluid immersion tank is used, the epoxy resin-based powder coating material may be charged by a needle-like discharge electrode to which a voltage is applied while it flows in the electrostatic fluid immersion tank, and may be applied to a surface of the spring on which a coating-film is formed.

(2) Baking Process

This process is a process in which the applied epoxy resin-based powder coating material is baked. The baking may be performed using an electric furnace, a hot air dryer, or the like which is generally used. A baking temperature may be, for example, 160° C. or higher and 220° C. or lower. A baking time may be about 5 to 30 minutes.

(3) Other Processes

[Pretreatment process] In order to improve corrosion resistance of the spring and adhesiveness of the coating film, a form in which the surface on which a coating-film is formed is a phosphate coating, that is, a form in which a phosphate coating is formed in advance on a surface of the base material of the spring, is desirable. In this case, this coating method may include a pretreatment process in which a phosphate coating is formed on a surface of the base material of the spring before the application process. The pretreatment process may be performed by, for example, immersing a spring in a phosphate solution tank or spraying a phosphate solution onto a spring using a spray gun.

[Preheating Process]

The application process may be performed at a normal temperature or when a spring is heated to a predetermined temperature. When the spring is heated in advance, application of the epoxy resin-based powder coating material is improved. In this case, this coating method may include a preheating process in which a spring is preheated before the application process. The preheating temperature is suitably 80° C. or higher and 250° C. or lower. Here, when the pretreatment process is performed before the application process, the preheating process may be performed after the pretreatment process. The preheating process may be performed in combination with drying of the spring after washing. In addition, a coating film to be formed is single-layer, and the thickness thereof is thin. Therefore, the baking process may be performed using only residual heat in the preheating process, that is, without additional heat. Of course, even if the spring is preheated, additional heating may be performed in the baking process.

EXAMPLES

The present invention will be described below in more detail with reference to examples.

<Epoxy Resin-Based Powder Coating Material>

According to raw materials shown in Table 1 and Table 2, 14 types of epoxy resin-based powder coating material were produced. First, predetermined raw materials were added to prepare coating material compositions, and these were mixed in advance, and then heated and kneaded in an extruder. Next, the obtained kneaded material was cooled, pulverized, and sieved to produce an epoxy resin-based powder coating material. The produced epoxy resin-based powder coating material was included in an epoxy resin-based powder coating material forming a coating film of a highly durable spring of the present invention. In Table 1 and Table 2, details of the raw materials are as follows.

Epoxy resin-1: "D. E. R. (registered trademark) 662E" with an epoxy equivalent of 610 g/eq and a softening point of 90° C. commercially available from Blue Cube Japan LLC Epoxy resin-2: "D. E. R. (registered trademark) 664U" with an epoxy equivalent of 925 g/eq and a softening point of 105° C. commercially available from Blue Cube Japan LLC Epoxy resin-3: "D. E. R. (registered trademark) 667E" with an epoxy equivalent of 1,775 g/eq and a softening point of 132° C. commercially available from Blue Cube Japan LLC Epoxy resin-4: "D. E. R. (registered trademark) 669E" with an epoxy equivalent of 3,250 g/eq and a softening point of 152° C. commercially available from Blue Cube Japan LLC Epoxy resin-5: "jER (registered trademark) 4005P" with an epoxy equivalent of 1,075 g/eq and a softening point of 90° C. commercially available from Mitsubishi Chemical Corporation Epoxy resin-6: "jER (registered trademark) YX4000" with an epoxy equivalent of 186 g/eq and a melting point of 105° C. commercially available from Mitsubishi Chemical Corporation Epoxy resin-7: "EPICLON (registered trademark) N-695" with an epoxy equivalent of 215 g/eq and a softening point of 95° C. commercially available from DIC Phenolic resin-1: "EPOTOTO (registered trademark) ZX-798P" with an active hydrogen equivalent of 720 g/eq and a softening point of 113° C. commercially available from Nippon Steel & Sumikin Chemical Co., Ltd.

Phenolic resin-2: "jER Cure (registered trademark) 171N" with an active hydrogen equivalent of 222 g/eq and a softening point of 80° C. commercially available from Mitsubishi Chemical Corporation Phenolic resin-3: "jER Cure (registered trademark) 170" with an active hydrogen equivalent of 333 g/eq and a softening point of 90° C. commercially available from Mitsubishi Chemical Corporation Zinc powder: "F500" with a spherical shape and an average particle size of 2 μm to 15 μm commercially available from Honjo Chemical Corporation Curing accelerator: "Curezol (registered trademark) 2MZ-H" commercially available from Shikoku Chemicals Corporation Foaming preventing agent (benzoin): commercially available from Miwon Specialty Chemical Surface adjusting agent: "DISPARLON (registered trademark) PL-525" commercially available from Kusumoto Chemicals Ltd.

Coloring pigment: "Mitsubishi (registered trademark) carbon black MA100" commercially available from Mitsubishi Chemical Corporation

TABLE 1

| Raw material: material added [g] | Example 1 | Example 2 | Example 3 | Example 4 | Example 5 | Example 6 |
| --- | --- | --- | --- | --- | --- | --- |
| Epoxy resin-1 | 100 | 100 | 100 | 100 | 100 | 100 |
| Phenolic resin-1 | 100 | 100 | 100 | 100 | 100 | 100 |

TABLE 1-continued

| Raw material: material added [g] | Example 1 | Example 2 | Example 3 | Example 4 | Example 5 | Example 6 |
|---|---|---|---|---|---|---|
| Zinc powder | 50 | 300 | 400 | 31 | 510 | 20 |
| Curing accelerator | 1 | 1 | 1 | 1 | 1 | 1 |
| Foaming preventing agent | 1 | 1 | 1 | 1 | 1 | 1 |
| Surface adjusting agent | 1 | 1 | 1 | 1 | 1 | 1 |
| Coloring pigment | 1 | 1 | 1 | 1 | 1 | 1 |
| Content of zinc [mass %] | 19.7 | 59.5 | 66.2 | 13.2 | 71.4 | 8.9 |
| Parts by mass of phenolic resin with respect to 100 parts by mass of epoxy resin | 100 | 100 | 100 | 100 | 100 | 100 |
| Epoxy equivalent [g/eq] | 610 | 610 | 610 | 610 | 610 | 610 |
| Active hydrogen equivalent [g/eq] | 720 | 720 | 720 | 720 | 720 | 720 |

TABLE 2

| Raw material: material added [g] | Example 7 | Example 8 | Example 9 | Example 10 | Example 11 | Example 12 | Example 13 | Example 14 |
|---|---|---|---|---|---|---|---|---|
| Epoxy resin-1 | — | — | — | — | — | — | 150 | 130 |
| Epoxy resin-2 | 120 | — | — | — | — | — | — | — |
| Epoxy resin-3 | — | — | 150 | — | — | — | — | — |
| Epoxy resin-4 | — | — | — | 170 | — | — | — | — |
| Epoxy resin-5 | — | 130 | — | — | — | — | — | — |
| Epoxy resin-6 | — | — | — | — | 50 | — | — | — |
| Epoxy resin-7 | — | — | — | — | — | 55 | — | — |
| Phenolic resin-1 | 80 | 70 | 50 | 30 | 150 | 145 | — | — |
| Phenolic resin-2 | — | — | — | — | — | — | 50 | — |
| Phenolic resin-3 | — | — | — | — | — | — | — | 70 |
| Zinc powder | 50 | 50 | 50 | 50 | 50 | 50 | 50 | 50 |
| Curing accelerator | 1 | 1 | 1 | 1 | 1 | 1 | 1 | 1 |
| Foaming preventing agent | 1 | 1 | 1 | 1 | 1 | 1 | 1 | 1 |
| Surface adjusting agent | 1 | 1 | 1 | 1 | 1 | 1 | 1 | 1 |
| Coloring pigment | 1 | 1 | 1 | 1 | 1 | 1 | 1 | 1 |
| Content of zinc [mass %] | 19.7 | 19.7 | 19.7 | 19.7 | 19.7 | 19.7 | 19.7 | 19.7 |
| Parts by mass of phenolic resin with respect to 100 parts by mass of epoxy resin | 66.7 | 53.8 | 33.3 | 17.6 | 300 | 263.6 | 33.3 | 53.8 |
| Epoxy equivalent [g/eq] | 925 | 1,075 | 1,775 | 3,250 | 186 | 215 | 610 | 610 |
| Active hydrogen equivalent [g/eq] | 720 | 720 | 720 | 720 | 720 | 720 | 222 | 333 |

In Table 1, the epoxy resin-based powder coating material shown in Example 1 was sprayed onto a steel plate preheated to 150° C. and then baked at 160° C. for 5 minutes, and thereby a coating film with a thickness of 300 μm was formed. The formed coating film was cut into a rectangular shape with a width of 10 mm and a length of 40 mm, and physical properties (a breaking stress, an elongation rate, and an elastic modulus) of the coating film were measured using an "Autograph AG-X" (commercially available from Shimadzu) under conditions of a temperature of 20° C. and a tensile speed of 5 mm/min. Table 3 shows values of the physical properties of the coating film.

TABLE 3

| Physical properties of coating film | Breaking stress [MPa] | 57.8 |
|---|---|---|
|  | Elongation rate [%] | 10.7 |
|  | Elastic modulus [MPa] | 2,748 |

<Evaluation of Coating Film>
(1) Each of the 14 types of the produced epoxy resin-based powder coating material was applied to a substrate, and application, flexibility, corrosion resistance, and smoothness of the coating film were evaluated. Description will be made in the following order.

[Production of Test Pieces of Examples 1 to 14]

The produced epoxy resin-based powder coating material was electrostatically applied to a flat substrate made of spring steel (SPCC-SD). The size of the substrate was 70 cm in height, 40 cm in width, and 3.2 mm in thickness, and a zinc phosphate coating was formed on the surface of the substrate. First, the substrate was preheated to 150° C. Next, the 14 types of the epoxy resin-based powder coating material were sprayed onto substrates using an electrostatic coating gun. Next, heating was performed at 160° C. for 5 minutes and a single-layer coating film was formed. The thickness of the formed coating film was 300 μm in all cases. In this manner, the test pieces of Examples 1 to 14 were produced.

[Production of Test Piece of Comparative Example 1]

A different powder coating material was applied to the same substrate as in the test pieces of Examples 1 to 14 and thereby a two-layer coating film was formed. The two-layer coating film was composed of an undercoat layer formed on the surface of the substrate and a topcoat layer laminated thereon. In order to form the two-layer coating film, an epoxy resin-based powder coating material containing a softener (hereinafter referred to as a powder coating material of a comparative example) was used. Table 4 shows the composition of the powder coating material of the comparative example. The powder coating material of the comparative example was produced such that a coating material composition excluding a softener was heated and kneaded and the softener was then dry-blended into a powder coating material produced by cooling, pulverizing, and sieving.

TABLE 4

| | Powder coating material of comparative example | |
|---|---|---|
| | Powder coating material for undercoat layer | Powder coating material for topcoat layer |
| Base resin | Epoxy resin | Polyester resin |
| Curing agent | Biguanide | Epoxy resin |
| Zink powder | 75 mass % | — |
| Extender pigment | — | Calcium carbonate |
| Softener | 9 mass % of urethane beads | 9 mass % of urethane beads |

A method of forming a two-layer coating film was as follows. First, a powder coating material for an undercoat layer was sprayed onto a substrate using an electrostatic coating gun. Next, heating was performed at 130° C. for 10 minutes and a semi-cured coating film was formed. Then, a powder coating material for a topcoat layer was sprayed onto the semi-cured coating film using the electrostatic coating gun. Finally, heating was performed at 185° C. for 20 minutes and thereby a two-layer coating film was formed. The thickness of the formed coating film was 50 μm in the undercoat layer and 430 μm in the topcoat layer. In this manner, the test piece of Comparative Example 1 was produced.

[Application]

The produced test pieces were subjected to a DuPont type test according to JIS K5600 5-3: 1999 and application of the coating film at normal temperature and low temperatures was evaluated. In the test of evaluating application at low temperatures, the test piece kept at −30° C. for 1 hour was used. The test was performed by placing the test piece on an impact deformation tester having a shooting mold with a diameter of ¼ inches with the coating film facing upward, and dropping a 500 g weight from a height of 50 cm. In this case, when no cracks were observed in the coating film, it was evaluated as favorable (indicated as "A" in Table 5 and Table 6), when some cracks were observed, but the level thereof was acceptable depending on applications, it was evaluated as acceptable (indicated as "B" in Table 5 and Table 6), and when it was not possible to use the coating film due to cracks, it was evaluated as unacceptable (indicated as "C" in Table 5 and Table 6). Evaluation results are shown in Table 5 and Table 6 below.

As shown in Table 5 and Table 6, in the test pieces of Examples 1 to 4, and 6 to 10, no cracks were observed in the coating films either at normal temperature or low temperatures. That is, it was confirmed that these coating films had excellent impact resistance and favorable application both at normal temperature and low temperatures. On the other hand, in the test piece of Comparative Example 1, although the two-layer coating film was formed, cracks were observed in the coating film both at normal temperature and low temperatures. In the test piece of Example 5, cracks were observed in the coating film only when it was kept at −30° C. In the test piece of Example 5, a content of zinc in the coating film was large. Thus, it is thought that the coating film became hard and impact resistance at low temperatures was lowered. Also in the test pieces of Examples 11 to 14, some cracks were observed in the coating film only when it was kept at −30° C. The coating films of the test pieces of Examples 11 and 12 were formed of a powder coating material using an epoxy resin with an epoxy equivalent of less than 300 g/eq. Thus, it is thought that softness of the coating film was lowered and impact resistance at low temperatures was lowered. The coating films of the test pieces of Examples 13 and 14 were formed of a powder coating material using a phenolic resin with an active hydrogen equivalent of 500 g/eq or less. Thus, it is thought that softness of the coating film was lowered and impact resistance at low temperatures was lowered.

[Flexibility]

The produced test pieces were subjected to a bending test according to JIS K5600 5-1: 1999 and the flexibility of the coating film at normal temperature and low temperatures was evaluated. In the bending test, a type 2 test device was used, and a mandrel with a diameter of 3 mm was used for the test pieces of Examples 1 to 14 and a mandrel with a diameter of 10 mm was used for the test piece of Comparative Example 1. In the test in which the flexibility at low temperatures was evaluated, the test piece kept at −30° C. for 1 hour was used. In this case, when no cracks were observed in the coating film, it was evaluated as favorable (indicated as "A" in Table 5 and Table 6), when some cracks were observed, but the level thereof was acceptable depending on applications, it was evaluated as acceptable (indicated as "B" in Table 5 and Table 6), and when it was not possible to use the coating film due to cracks, it was evaluated as unacceptable (indicated as "C" in Table 5 and Table 6). Evaluation results are shown in Table 5 and Table 6 below.

As shown in Table 5 and Table 6, in the test pieces of Examples 1, 2, 4, and 6 to 10, no cracks were observed in the coating films either at normal temperature or low temperatures. That is, it was confirmed that these coating films had excellent flexibility both at normal temperature and low temperatures. On the other hand, in the test piece of Comparative Example 1, although the two-layer coating film was formed, the coating film cracked at normal temperature. Thus, the test at low temperatures was not performed. In the test piece of Example 3, some cracks were observed in the coating film only when it was kept at −30° C. In the test piece of Example 5, cracks were observed in the coating film only when it was kept at −30° C. In the test pieces of Examples 3 and 5, a content of zinc in the coating film was large. Thus, it is thought that the coating film became hard and the flexibility at low temperatures was lowered. In the test pieces of Examples 11 to 14, some cracks were observed in the coating film only when it was kept at −30° C. As described above, in the test pieces of Examples 11 to 14, it is thought that the flexibility at low temperatures was lowered since the softness of the coating film was lowered.

[Corrosion Resistance]

The produced test pieces were subjected to a salt water spray test according to JIS K5600 7-1: 1999, and corrosion resistance of the coating film was evaluated. First, a cross-cut was formed in the coating film of the test piece. Next, the test piece was put into a salt water spray test machine (NaCl concentration 5%, 35° C.) and left for 840 hours or 1,200 hours. Then, the test piece was taken out and a rust width of the cross-cut part was measured. The measurement results are shown in Table 5, and Table 6 below.

As shown in Table 5 and Table 6, the rust widths of the test pieces of Examples 1 to 3, 5, and 7 to 13 were less than 0.5 mm at any retention time, and it was confirmed that these test pieces had excellent corrosion resistance the same as in the test piece of Comparative Example 1. On the other hand, the rust width of the test piece of Example 4 was 2.0 mm, and the rust width of the test piece of Example 6 was 5.0 mm. In these test pieces, a content of zinc in the coating film was small. Therefore, it is thought that a sufficient anti-corrosion effect according to zinc was not exhibited.

[Smoothness]

The coating film of the produced test piece was visually observed. When the surface was flat, it was evaluated as favorable (indicated as "A" in Table 5 and Table 6), when some irregularities were observed in the surface, it was evaluated as acceptable (indicated as "B" in Table 5 and Table 6), and when irregularities were noticeable in the surface, it was evaluated as unacceptable (indicated as "C" in Table 5 and Table 6). Evaluation results are shown in Table 5 and Table 6 below.

As shown in Table 5 and Table 6, the surfaces of the coating films of the test pieces of Examples 1 to 8, and 11 to 14 were all smooth. On the other hand, the coating films of the test pieces of Examples 9 and 10 were formed of a powder coating material using an epoxy resin with an epoxy equivalent of more than 1,500 g/eq. Therefore, it is thought that the smoothness of the surface of the coating film was lowered.

TABLE 5

|  |  | Comparative Example 1 | Example 1 | Example 2 | Example 3 | Example 4 | Example 5 | Example 6 |
|---|---|---|---|---|---|---|---|---|
| Content of zinc [mass %] | | — | 19.7 | 59.5 | 66.2 | 13.2 | 71.4 | 8.9 |
| Parts by mass of phenolic resin with respect to 100 parts by mass of epoxy resin | | — | 100 | 100 | 100 | 100 | 100 | 100 |
| Epoxy equivalent [g/eq] | | — | 610 | 610 | 610 | 610 | 610 | 610 |
| Active hydrogen equivalent [g/eq] | | — | 720 | 720 | 720 | 720 | 720 | 720 |
| Application (impact test) | Room temperature | C | A | A | A | A | A | A |
| | −30° C. | C | A | A | A | A | C | A |
| Flexibility (bending test) | Room temperature | C | A | A | A | A | A | A |
| | −30° C. | — | A | A | B | A | C | A |
| Corrosion resistance (salt water spray test) | 840 hours | <0.5 mm | <0.5 mm | <0.5 mm | <0.5 mm | 2.0 mm | <0.5 mm | 5.0 mm |
| | 1,200 hours | <0.5 mm | <0.5 mm | <0.5 mm | <0.5 mm | 2.0 mm | <0.5 mm | 5.0 mm |
| Smoothness (visual observation) | | A | A | A | A | A | A | A |

TABLE 6

|  |  | Example 7 | Example 8 | Example 9 | Example 10 | Example 11 | Example 12 | Example 13 | Example 14 |
|---|---|---|---|---|---|---|---|---|---|
| Content of zinc [mass %] | | 19.7 | 19.7 | 19.7 | 19.7 | 19.7 | 19.7 | 19.7 | 19.7 |
| Parts by mass of phenolic resin with respect to 100 parts by mass of epoxy resin | | 66.7 | 53.8 | 33.3 | 17.6 | 300 | 263.6 | 33.3 | 53.8 |
| Epoxy equivalent [g/eq] | | 925 | 1,075 | 1,775 | 3,250 | 186 | 215 | 610 | 610 |
| Active hydrogen equivalent [g/eq] | | 720 | 720 | 720 | 720 | 720 | 720 | 222 | 333 |
| Application (impact test) | Room temperature | A | A | A | A | A | A | A | A |
| | −30° C. | A | A | A | A | B | B | B | B |
| Flexibility (bending test) | Room temperature | A | A | A | A | A | A | A | A |
| | −30° C. | A | A | A | A | B | B | B | B |
| Corrosion resistance (salt water spray test) | 840 hours | <0.5 mm | <0.5 mm | <0.5 mm | <0.5 mm | <0.5 mm | <0.5 mm | <0.5 mm | <0.5 mm |
| | 1,200 hours | <0.5 mm | <0.5 mm | <0.5 mm | <0.5 mm | <0.5 mm | <0.5 mm | <0.5 mm | <0.5 mm |
| Smoothness (visual observation) | | A | A | B | C | A | A | A | A |

(2) In Table 1, the epoxy resin-based powder coating material described as Example 1 was applied to a coil spring, and the low temperature chipping resistance was evaluated. Descriptions will be made below in order.

[Production of Coil Spring of Example 1]

First, sand blast processing was performed on the surface of the base material of the coil spring made of spring steel (SPCC-SD), and a zinc phosphate coating was additionally formed. Next, the coil spring was placed on a coating line and heated and dried at 120° C. for 10 minutes. Subsequently, the substrate was preheated to 130° C. Then, the epoxy resin-based powder coating material of Example 1 was sprayed onto the substrate using the electrostatic coating gun. Then, heating was performed at 200° C. for 45 minutes, and a single-layer coating film was formed. The thickness of the formed coating film was 300 µm. In this manner, the coil spring of Example 1 was produced. The coil spring of Example 1 was included in the highly durable spring of the present invention.

[Production of Coil Spring of Comparative Example 1]

First, a zinc phosphate coating was formed on the surface of the base material of the same coil spring as in Example 1. Next, the coil spring was placed on a coating line and heated and dried at 120° C. for 10 minutes. Then, the powder coating material for an undercoat layer described above (refer to Table 4 above) was applied to the surface of the coil spring using the residual heat. Subsequently, heating was performed at 130° C. for 10 minutes, and a semi-cured coating film was formed. Then, the powder coating material for a topcoat layer described above (refer to Table 4 above) was sprayed onto the semi-cured coating film using the electrostatic coating gun. Finally, heating was performed at 200° C. for 30 minutes and a two-layer coating film was formed. The thickness of the formed coating film was 50 µm in the undercoat layer and 430 µm in the topcoat layer. In this manner, the coil spring of Comparative Example 1 was produced.

[Low Temperature Chipping Resistance]

(i) Test A

Pebbles were made to collide with the produced coil spring at −30° C. using a gravel testing machine and the chipping resistance of the coating film was evaluated. A pebble injection nozzle was disposed perpendicular to the axial direction of the coil spring. A distance between the injection nozzle and the coil spring was 300 mm. As the pebble, 200 g of No. 6 crushed stone was used and a launch speed was 0.8 MPa. Pebble injection was performed for 2 seconds at a time and this was repeated until the coating film had peeled off due to pebble collision and the base material was exposed.

In gravel test results, the base material was exposed 10 times in the coil spring of Comparative Example 1 but the base material was exposed 50 times in the coil spring of Example 1. Therefore, according to the highly durable spring of the present invention, it was confirmed that the chipping resistance was improved despite the thin thickness of the coating film.

(ii) Test B

A gravel test was performed once on the produced coil spring in the same manner as in the test A except that a pebble launch speed was changed to 0.5 MPa. Then, the coil spring was left in a salt water spray test machine for 24 hours (NaCl concentration 5%, 35° C.). This cycle of gravel test→salt water spray test was repeated until red rust occurred.

Regarding a result, in the coil spring of Comparative Example 1, red rust occurred 5 times, but in the coil spring of Example 1, red rust occurred for the first time when the cycle had been repeated 50 times. Therefore, according to the highly durable spring of the present invention, it was confirmed that the chipping resistance was improved and the durability of the spring was improved despite the thin thickness of the coating film.

INDUSTRIAL APPLICABILITY

The highly durable spring of the present invention is beneficial for automobiles, railway vehicles, and the like, and is particularly suitable as a suspension spring of automobiles.

The invention claimed is:

1. A highly durable spring consisting of:
a spring; and
a single-layer coating film with a thickness that is in a range of from 200 µm or more and 450 µm or less, wherein
the single-layer coating film is on the spring,
the single-layer coating film consists essentially of an epoxy resin, a phenolic resin, and zinc, the zinc having an average particle size of 2 µm to 15 µm and being in a spherical shape,
the single-layer coating film does not contain a softener or a fibrous filler, and
a content of the zinc is 10 mass % or more and 70 mass % or less when the mass of the entire single-layer coating film is set as 100 mass %.

2. The highly durable spring according to claim 1, wherein the single-layer coating film is a cured product of an epoxy resin-based powder coating material containing the epoxy resin, the phenolic resin, and the zinc.

3. A method of coating the highly durable spring according to claim 1, comprising:
an application process including applying an epoxy resin-based powder coating material to a surface of the spring on which the single-layer coating film is formed, wherein the epoxy resin-based powder coating material contains the epoxy resin, the phenolic resin, and the zinc and is produced by a melt kneading method; and
a baking process including baking the applied epoxy resin-based powder coating material.

4. The method according to claim 3, wherein an amount of the phenolic resin added is 3 parts by mass or more and 3,000 parts by mass or less when an amount of the epoxy resin added is set as 100 parts by mass.

5. The method according to claim 3, further comprising a preheating process including preheating the spring to 80° C. or higher and 250° C. or lower before the application process.

6. The method according to claim 5, wherein the baking process is performed using only residual heat in the preheating process.

7. The highly durable spring according to claim 1, wherein the thickness of the single-layer coating film is in a range of from 200 µm or more and 300 µm or less.

8. The highly durable spring according to claim 1, wherein the content of the zinc is 10 mass % or more and 65 mass % or less when the mass of the entire single-layer coating film is set as 100 mass %.

9. The highly durable spring according to claim 1, wherein the epoxy resin has an epoxy equivalent that is in a range of from 300 to 1500 g/eq.

10. The highly durable spring according to claim 1, wherein the phenolic resin has an active hydrogen equivalent that is in a range of from 500 to 4000 g/eq.

11. The highly durable spring according to claim 1, wherein the single-layer coating film does not contain thermally expandable resin particles.

12. The highly durable spring according to claim 1, wherein the single-layer coating film does not contain a foaming agent.

13. The highly durable spring according to claim 1, wherein the single-layer coating film does not contain an anti-corrosion pigment.

* * * * *